March 20, 1945. E. S. COOKE 2,371,804
CLUTCH MECHANISM
Filed July 13, 1943 3 Sheets-Sheet 1

Inventor:
Ernest S. Cooke,
By F. G. Fischer,
Attorney.

March 20, 1945.　　　E. S. COOKE　　　2,371,804
CLUTCH MECHANISM
Filed July 13, 1943　　　3 Sheets-Sheet 2
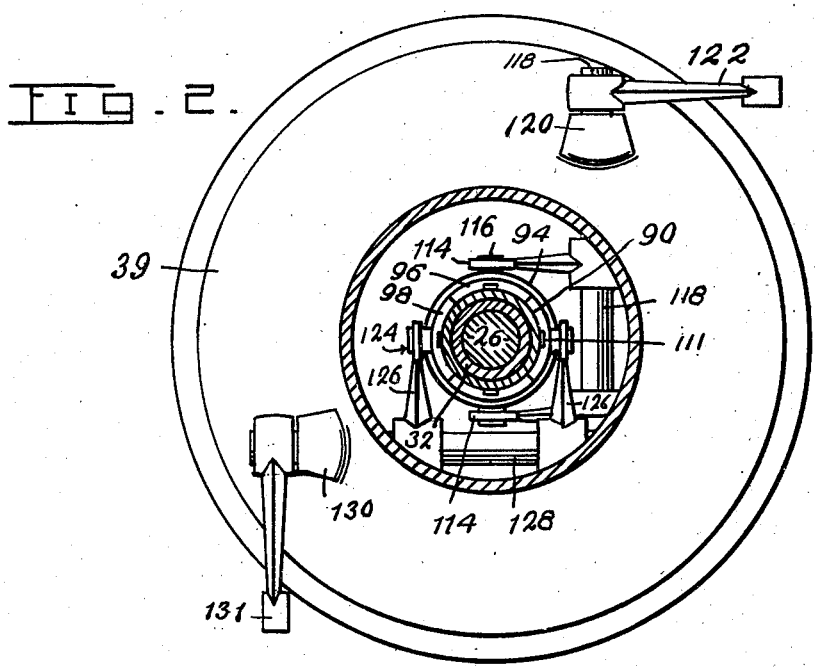
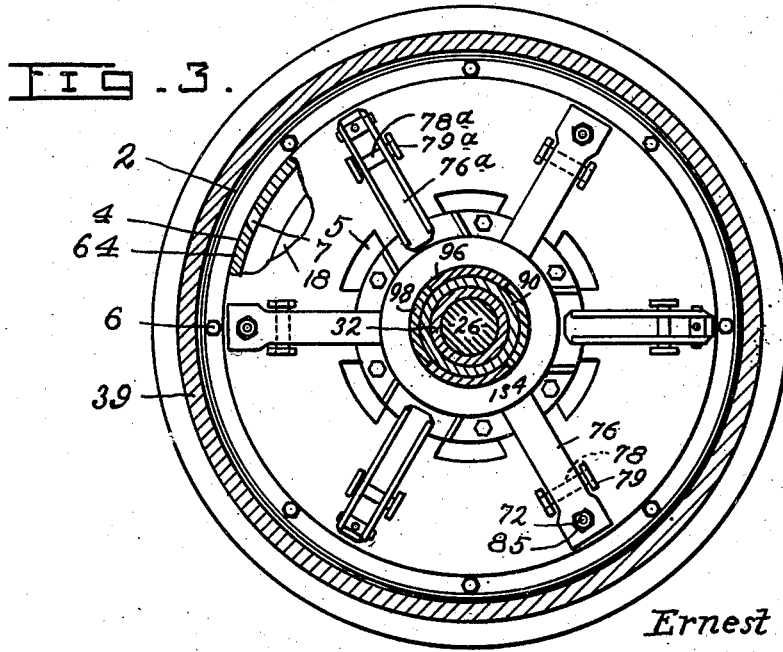
INVENTOR:
Ernest S. Cooke,
BY
F. G. Fischer,
ATTORNEY.

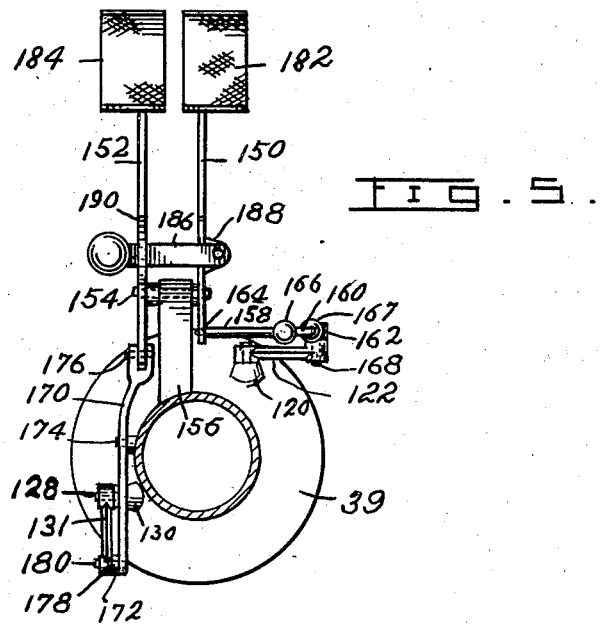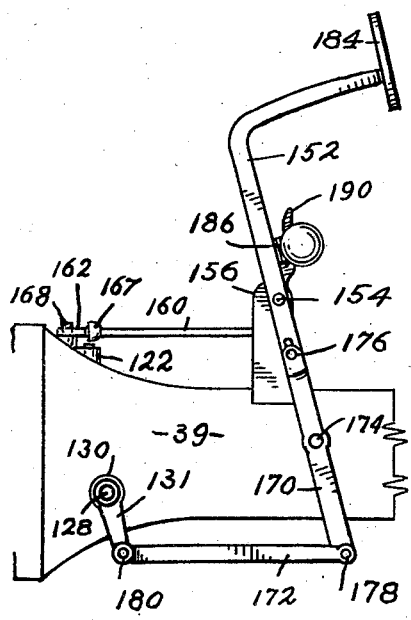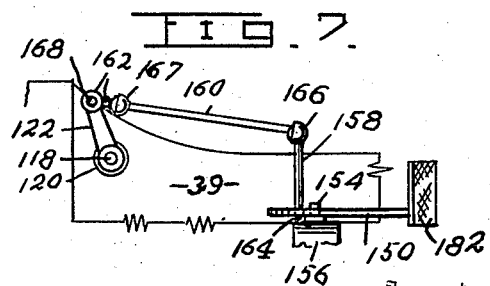

Patented Mar. 20, 1945

2,371,804

UNITED STATES PATENT OFFICE 2,371,804

CLUTCH MECHANISM

Ernest S. Cooke, Leawood, Kans.

Application July 13, 1943, Serial No. 494,559

10 Claims. (Cl. 192—48)

This invention relates to a double acting clutch mechanism and the present invention is an improvement on the clutch mechanism disclosed by my U. S. Letters Patent No. 2,261,432 granted on the 4th day of November, 1941.

The present invention relates more particularly to means whereby both clutches may be simultaneously engaged or disengaged, or either clutch can be engaged or disengaged independently of the other.

In order that the invention may be fully understood, reference will now be had to the accompanying drawings, in which:

Fig. 2 is a cross section on line 2—2 of Fig. 1, with some parts removed.

Fig. 3 is a cross section on line 3—3 of Fig. 1 with the clutch mechanism turned counter-clockwise approximately one-twelfth of a revolution from the position shown by Fig. 1.

Fig. 5 is a rear elevation showing mechanism employed in simultaneously or independently engaging or disengaging the clutch mechanism.

Fig. 6 is a side elevation of the mechanism disclosed by Fig. 5.

Fig. 7 is a broken top plan view of some of the parts disclosed by Figs. 5 and 6.

Figure 1:
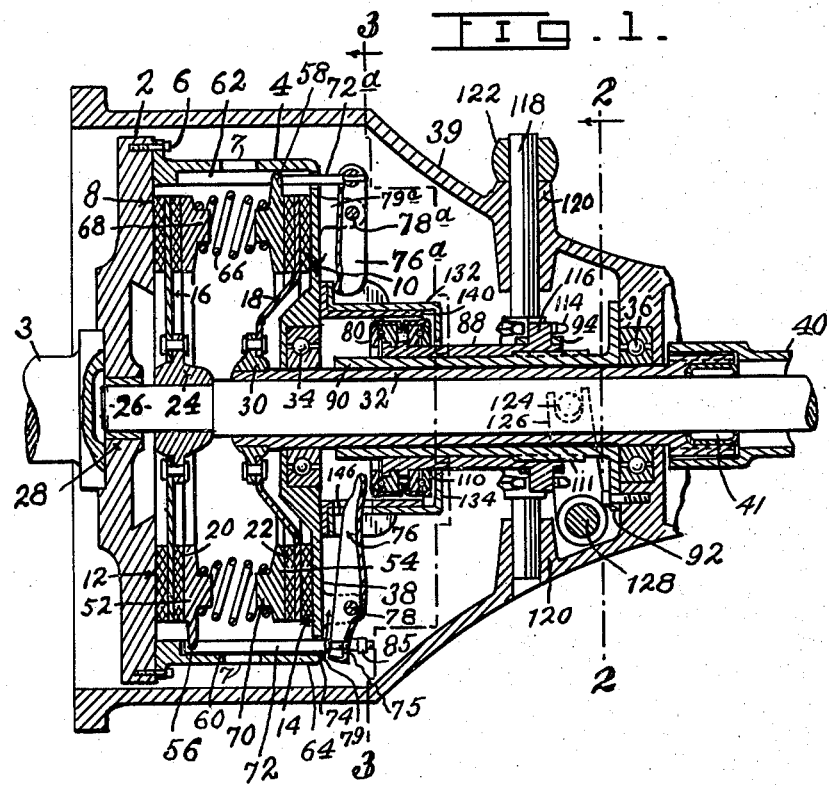
Fig. 1 is a vertical sectional view of my improved clutch mechanism.

Referring more particularly to Fig. 1, the numeral 2 designates one of the clutch driving elements which, in the present instance, is in the form of a flywheel mounted upon a shaft 3 which may be an engine crank-shaft. The flywheel 2 has a casing 4 constituting another clutch driving element axially alined with and secured to the flywheel by suitable means such as bolts 6. The clutch casing 4 has inlet and outlet air ports 5 and 7 in its rear and annular walls, respectively, for the free circulation of air to prevent overheating of the enclosed clutch members. The flywheel 2 and the clutch casing 4 have friction faces 8 and 10 for engagement with the adjacent friction faces 12 and 14 of a pair of disks 16 and 18, respectively, enclosed within the clutch casing 4 and axially alined therewith and the flywheel 2. The disks 16 and 18 also have friction faces 20 and 22, respectively, confronting each other for a purpose which will hereinafter appear. The disk 16 is provided with a hub 24 splined upon a direct drive shaft 26 which may be utilized for driving the transmission mechanism, not shown, of a tractor or other vehicle on which the clutch mechanism is installed. The drive shaft 26 is journaled at its forward end in a pilot bearing 28 fixed axially in the hub of the flywheel 2. The disk 18 has a hub 30 splined or otherwise connected to the forward end of a tubular shaft 32 through which the drive shaft 26 freely extends so that either one may rotate independently of the other.

The tubular shaft 32 is journaled in ball-bearings 34 and 36, mounted in the rear wall 38 of the clutch casing 4 and a housing 39, respectively, which latter encloses the clutch mechanism and may be secured to the rear end of the engine block, not shown. The rear end of the tubular shaft 32 is splined to or otherwise connected to the forward end of another tubular shaft 40 which may be utilized for operating a power take-off similar to the one disclosed by my above-mentioned patent, or for such other purposes as may be desired. A roller-bearing 41 is interposed between the drive shaft 26 and the rear portion of the tubular shaft 32.

A pair of annular clamping members 52 and 54 are axially arranged between and adjacent to the respective friction disks 16 and 18, and provided with peripheral lugs 56 and 58 which project freely into equally spaced internal grooves 60 and 62, respectively, arranged longitudinally in the annular wall 64 of the clutch casing 4 to provide means through which the latter drives said clamping members.

Equi-spaced loading springs 66 are interposed between the clamping members 52 and 54 to press them into engagement with the friction faces 20 and 22 of the disks 16 and 18, which in turn are pressed against the friction faces 8 and 10 of the flywheel 2 and the clutch casing 4, respectively, so that said disks 16 and 18 may rotate as a unit with the flywheel 2, the clutch casing 4 and the clamping members 52 and 54 and thus drive the shafts 26 and 32, respectively. The loading springs 66 are preferably in the form of conical springs as shown and their opposite ends are held in axial alinement by opposed bosses 68 and 70 projecting laterally from the clamping members 52 and 54, respectively.

The clamping member 52 is adapted to be moved axially out of engagement with the friction disk 16 to release the latter from the flywheel 2, by pull-rods 72 connected at one end to the respective peripheral lugs 56 and extending longitudinally through the grooves 60 and apertures 74, which latter register with the former and extend through the rear wall 38 of the clutch casing 4. The outer ends of the pull-rods 72 extend freely through apertures 75 in the outer ends of a set of throw-out levers 76 mounted upon respective pivots 78 carried by ears 79 projecting from the rear wall 38 of the clutch casing 4. The inner ends of the throw-out levers 76 terminate adjacent to an annular ball-race 80 spaced by a series of intervening anti-friction balls 82 from a companion ball-race 84. The outer ends of the pull-rods 72 are threaded to receive nuts 85 whereby the throw-out levers 76 are so adjusted as to normally remain out of frictional contact with the ball-race 80. The ball-races 80 and 84 are held in assembly by a peripheral ring 86.

In order that the disk 18 may be released from the friction face 10 of the clutch casing 4, the clamping member 54 is arranged to be shifted axially out of engagement with said friction disk 18, by an arrangement of pull-rods and throw-out levers similar to those employed for shifting the clamping member 52 out of engagement with the friction disk 16, as evidenced by corresponding reference numerals with exponents a. The throw-out levers 76 and 76a are radially disposed with respect to the drive shaft 26 and the tubular shaft 32 as shown by Fig. 3.

The different parts so far described are somewhat similar in construction and operation to the parts disclosed by my patent hereinbefore referred to, the new features of my present invention residing more particularly in means whereby both clutches may be simultaneously engaged or disengaged, or either clutch may be engaged or disengaged independently of the other.

Referring now more particularly to the new features, 88 designates a nonrotatable sleeve reciprocably mounted upon a stationary tubular support 90 which freely surrounds and is concentric with the tubular shaft 32 and has an annular flange 92 at its rear end bolted or otherwise secured to the housing 39. The sleeve 88 comprises a plurality of longitudinal segments curved transversely to slidably fit upon the support 90 and are held in assembly by the ball-race 84, ball-races hereinafter described, and a ring 94. The sleeve 88 may comprise any suitable number of segments. In the present instance I have shown two pairs of segments 96 and 98, respectively, the segments of each pair being diametrically opposed as best shown by Figs. 2 and 3. The segments 96 and 98 are provided adjacent their forward ends with peripheral segmental collars 100 and 102, respectively. The collars 100 are spaced apart, Fig. 4, to freely receive an internal annular flange 104 on the ball-race 84. The collars 102 are likewise spaced apart to freely receive an annular internal flange 106 of a ball-race 108 freely embracing the sleeve 88 and arranged beside a companion ball-race 110, which latter cooperates with the former in providing a runway for a plurality of antifriction balls 112. The segments are held from rotating with the ball-races 84 and 108 by respective groove and feather connections 111 with the tubular support 90. The segments 96 and 98 are provided with laterally projecting lugs 116 and 124, respectively, for a purpose which will presently appear. Somewhat similar means are employed for operating the segments 96 and 98 either independently or simultaneously, comprising rock-levers 114, 126 having forked terminals engaging the lugs 116 and 124, respectively. The rock-levers 114 are fixed to a vertical rock-shaft 118 mounted in bearings 120 and provided at an outer end with a control lever 122. The rock-levers 126 are fixed upon a horizontal rock-shaft 128 mounted in bearings 130 and provided at an outer end with a fixed control lever 131. The levers 122 and 131 may be independently or simultaneously operated, and in practice will be preferably controlled by linkage extending to within convenient reach of the driver.

The linkage or means for operating the levers 122 and 131 may be of any appropriate form, such, for example as that disclosed by Figs. 5 to 7, inclusive, in which 150 and 152 designate a pair of foot pedals arranged side by side and mounted upon a fulcrum 154 projecting from opposite sides of a bearing 156 fixed upon the housing 39.

The pedal 150 is adapted to operate the lever 122 through a member 158, a link 160, and a member 162. The member 158 has one end 164 connected to the lower end of the pedal 150 and its opposite end connected by a ball-and-socket joint 166 to the rear end of the link 160, which is connected at its forward end by a ball-and-socket joint 167 to the rear end of the member 162, the opposite end of which is connected to the lever 122 by a pivot 168. By providing the foregoing connections ample flexibility is provided to enable the different parts to operate freely when the pedal 150 is actuated.

The pedal 152 is adapted to operate the lever 131 through a lever 170 and a link 172. The lever 170 is mounted upon a fulcrum 174 and has a pin and slot connection 176 at one end with the lower end of the pedal 152, and a pivotal connection 178 at its opposite end with the link 172, which latter has a pivotal connection 180 with the lever 131.

In order that the foot pedals 150 and 152 may be operated either independently or simultaneously, I provide their upper ends with foot plates 182 and 184, respectively. The foot plates are placed in close proximity so that either one may be independently actuated by a foot of the operator, or the foot may be placed to span both foot plates to simultaneously actuate the pedals 150 and 152, respectively. If preferred, any appropriate means may be employed for locking the pedals 150 and 152 together for simultaneous operation. In the present instance I have shown, for the above purpose, a latch 186 pivoted at one end to a lug 188 on the pedal 150, so that the latch may be swung into or out of engagement with a keeper 190 on the pedal 152.

When the levers 122 and 131 are actuated as above described the lever 122, through the intervening parts advances the sleeve segments 96 and the lever 131 causes retraction of the sleeve segments 98.

Figure 4:
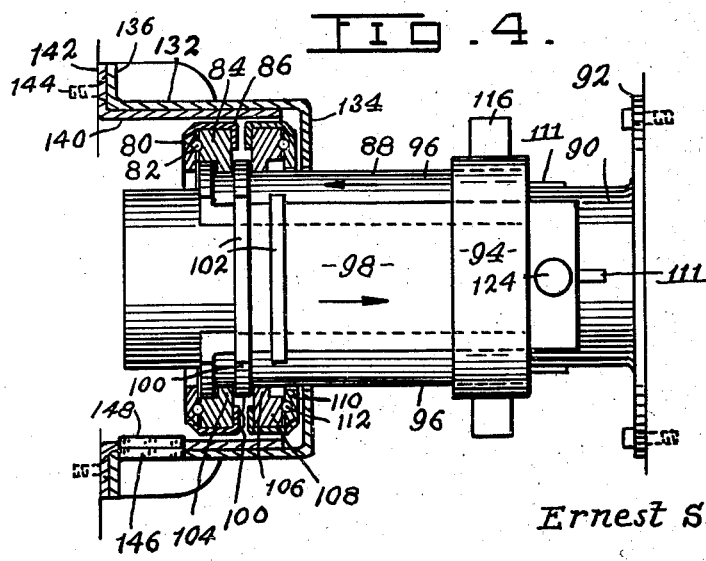
Fig. 4 is an enlarged elevation of important parts of the present invention.

With the foregoing arrangement it is apparent that when the segments 96 are shifted forwardly, Figs. 1 and 4, they will effect release of the friction disk 16 from the flywheel 2 by shifting the clamping member 52 backward through the instrumentality of the ball-race 80, the throw-out levers 76 and pull-rods 72. Release of the friction disk 16 stops rotation of the drive shaft 26, while the friction disk 18 continues to rotate the tubular shaft 32.

When the pair of segments 98 are moved backwardly, Fig. 4, they effect release of the friction disk 18 from the friction face 10 by shifting the clamping member 54 forwardly through the intermediacy of the ball-race 110, a tubular member 132, the throw-out levers 76a, and the pull-rods 72a. Release of the friction disk 18 permits the tubular shaft 32 to stop while the drive shaft 26 continues to rotate.

The tubular member 132 is provided at its rear end with an internal annular flange 134 for engagement with the ball-race 110, and provided at its forward end with an external annular flange 136 for engagement with the throw-out levers 76a. The tubular member 132 is slidably mounted upon a tubular guide 140 freely surrounding the ball-bearings on sleeve 88. The guide 140 is provided at its forward end with an external annular flange 142, secured to the rear wall of the clutch casing 4 by appropriate means such as screws 144. Registering longitudinal slots 146 and 148 are provided in the tubular member 132 and the guide 140, respectively, through which the inner ends of the throw-out levers 76 project into the path of the ball-race 80.

From the foregoing description taken in connection with the accompanying drawings it is apparent that I have provided clutch mechanism having the advantages above pointed out, and although I have described in detail some specific embodiments of my invention it is not my desire that my invention be limited to the embodiments described and disclosed herein, as various changes may be made without departing from the scope of my invention as claimed.

Having thus described my invention, what I claim and desire to secure by Letters Patent, is:

1. In clutch mechanism comprising, in combination, first and second coaxial clutches, each comprising cooperative elements, a shaft for each clutch, first and second clamping members mounted for rotation with both clutches and arranged for independent axial movement, spring means interposed between said clamping members to force them axially in opposite directions and thereby effect engagement of each clutch, first and second sets of throw-out levers mounted for rotation with a clutch element and operably connected to the first and second clamping members, respectively, to move them toward each other and thereby effect disengagement of each clutch, a support, a sleeve mounted upon said support and including slidable first means which, when slid in one direction operates the first set of throw-out levers, and second slidable means adapted to be slid in an opposite direction to the movement of the first slidable means, a member actuated by the second slidable means and adapted to operate the second set of throw-out levers, and manually controlled means connected to the first and second slidable means to operate the same either simultaneously or independently.

2. In clutch mechanism comprising, in combination, first and second coaxial clutches, each comprising cooperative elements, a shaft for each clutch, first and second clamping members mounted for rotation with both clutches and arranged for independent axial movement, spring means interposed between said clamping members to force them axially in opposite directions and thereby effect engagement of each clutch, first and second sets of throw-out levers radially mounted upon a rotary clutch element and operably connected to the first and second clamping members, respectively, to move them toward each other and thereby effect disengagement of each clutch, a support, a sleeve comprising first and second means slidable upon the support, said first slidable means being adapted when slid in one direction to operate the first set of throw-out levers, a member adapted to actuate the second set of throw-out levers and in turn be actuated by the said second slidable means, and means for operating said first and second sets of slidable means.

3. In clutch mechanism comprising, in combination, first and second coaxial clutches, each comprising cooperative elements, a shaft for each clutch, first and second clamping members mounted for rotation with both clutches and arranged for independent axial movement, spring means interposed between said clamping members to force them axially in opposite directions and thereby effect engagement of each clutch, first and second sets of throw-out levers radially mounted upon a rotary clutch element and operably connected to the first and second clamping members, respectively, to move them toward each other and thereby effect disengagement of each clutch, a support, a sleeve comprising first and second means slidable upon the support, said first slidable means being adapted to operate the first set of throw-out levers, a tubular support carried by one of the clutch members and arranged concentrically with the sleeve, a tubular member slidable upon the last-mentioned support and provided with a peripheral flange adapted to operate the second set of throw-out levers, said tubular member being adapted to be actuated by the second slidable means, and means for operating said first and second sets of slidable means.

4. In clutch mechanism comprising, in combination, first and second coaxial clutches, each comprising cooperative elements, a shaft for each clutch, first and second clamping members mounted for rotation with both clutches and arranged for independent axial movement, spring means interposed between said clamping members to force them axially in opposite directions and thereby effect engagement of each clutch, first and second sets of throw-out levers mounted for rotation with a clutch element and operably connected to the first and second clamping members, respectively, to move them toward each other and thereby effect disengagement of each clutch, a support, a sleeve mounted upon said support and including first and second slidable means, antifrictional means mounted upon the sleeve and connected to the first slidable means whereby when the latter is moved in one direction said antifrictional means will actuate the first set of throw-out levers, a tubular member interposed between the second set of throw-out levers and the second set of slidable means whereby when the latter are shifted in an opposite direction to the movement of the first slidable means the second set of throw-out levers will be actuated, and manually controlled means for shifting the slidable means.

5. In clutch mechanism comprising, in combination, first and second coaxial clutches, each comprising cooperative elements, a shaft for each clutch, first and second clamping members mounted for rotation with both clutches and arranged for independent axial movement, spring means interposed between said clamping members to force them axially in opposite directions and thereby effect engagement of each clutch, first and second sets of throw-out levers mounted for rotation with a clutch element and operably connected to the first and second clamping members, respectively, to move them toward each other and thereby effect disengagement of each clutch, a support, a sleeve mounted upon said support and including slidable first means which, when slid in one direction operates the first set of throw-out levers, and second slidable means adapted to be slid in an opposite direction to the movement of the first slidable means, a tubular member concentric with the sleeve and provided with an internal annular flange, antifrictional means mounted upon the second slidable means adapted to engage said internal flange and cause the tubular member to actuate the second set of levers when said second slidable means is moved in an opposite direction to the movement of the first slidable means, and means for operating the first and second slidable means.

6. In clutch mechanism comprising, in combination, first and second coaxial clutches, each comprising cooperative elements, a shaft for each clutch, first and second clamping members mounted for rotation with both clutches and arranged for independent axial movement, spring means interposed between said clamping members to force them axially in opposite directions and thereby effect engagement of each clutch, first and second sets of throw-out levers mounted for rotation with a clutch element and operably connected to the first and second clamping members, respectively, to move them toward each other and thereby effect disengagement of each clutch, a sleeve comprising first and second segmental means, a support upon which said segmental means are slidably mounted, a slidable member supported between the second set of levers and the second segmental means, means for sliding the first segmental means in one direction to effect operation of the first set of levers, and means for sliding the second segmental means in an opposite direction to the movement of the first segmental means to actuate the second set of levers through the instrumentality of the intervening slidable member.

7. In clutch mechanism, a nonrotatable sleeve comprising diametrically-opposed pairs of segments, means for holding said segments in assembly, a stationary support upon which the segments are mounted for axial movement, and manually controlled means associated with each pair of segments whereby the latter may be moved axially either independently or simultaneously.

8. In clutch mechanism, a nonrotatable sleeve comprising diametrically-opposed pairs of segments, means for holding said segments in assembly, parallel peripheral shoulders spaced apart upon each pair of segments, and ball bearings encircling the segments and provided with internal annular flanges, respectively, one of said flanges projecting between the shoulders on one pair of segments and the other flange projecting between the shoulders of the other pair of segments, and a fixed support upon which said sleeve is slidably mounted.

9. In clutch mechanism, a sleeve comprising diametrically-opposed pairs of segments, means for holding said segments in assembly, lugs projecting from each pair of segments, levers associated with the lugs of each pair of segments for operating the latter, shafts upon which said levers are fixed, means for operating said shafts, and a support upon which the segments are operably mounted.

10. In clutch mechanism including a pair of coaxial clutches, a pair of clamping members interposed between and coaxial with said clutches, spring means interposed between said clamping members to force them in opposite directions and thereby effect engagement of the cooperating elements of each clutch, and throw-out means for forcing the clamping members toward each other to effect disengagement of the elements of each clutch, said throw-out means including a nonrotatable sleeve coaxial with the clamping members and comprising a plurality of segments slidable in parallel relation to the axis of the sleeve, means for retaining the segments in assembly, and operating means whereby certain of the segments may be slid in one direction and the other segments may be slid in the opposite direction to effect axial movement of the clamping members toward each other.

ERNEST S. COOKE.